United States Patent [19]

Larsson

[11] Patent Number: 4,630,700

[45] Date of Patent: Dec. 23, 1986

[54] ADJUSTABLE OPERATOR CAB ON A MOTOR-DRIVE TRUCK

[75] Inventor: Nils-Olof Larsson, Halmstad, Sweden

[73] Assignee: Kalmar LMV, Ljungby, Sweden

[21] Appl. No.: 798,111

[22] Filed: Nov. 14, 1985

[30] Foreign Application Priority Data

Dec. 3, 1984 [SE] Sweden ............................... 8406091

[51] Int. Cl.[4] ............................................ B62D 33/06

[52] U.S. Cl. ................................ 180/89.13; 172/431; 180/89.12; 296/190

[58] Field of Search ............... 180/89.13, 89.12, 89.18; 296/190; 172/431, 435

[56] References Cited

U.S. PATENT DOCUMENTS

| | | | |
|---|---|---|---|
| 3,595,409 | 7/1971 | Bowman-Shaw | 180/89.13 |
| 3,944,277 | 3/1976 | Cyphert | 180/89.13 |
| 4,018,473 | 4/1977 | Chalupsky | 296/190 |
| 4,024,968 | 5/1977 | Shaffer | 296/190 |

FOREIGN PATENT DOCUMENTS

| | | | |
|---|---|---|---|
| 113335 | 1/1984 | European Pat. Off. . | |
| 3000696 | 7/1981 | Fed. Rep. of Germany | 180/89.13 |
| 3036304 | 5/1982 | Fed. Rep. of Germany | 296/190 |
| 3128284 | 2/1983 | Fed. Rep. of Germany | 180/89.13 |
| 2261164 | 9/1975 | France | 296/190 |
| 195639 | 11/1983 | Japan | 296/190 |
| 2043555 | 10/1980 | United Kingdom | 296/190 |

OTHER PUBLICATIONS

An article in Swedish Journal, "Ny Teknik, Teknisk Tidskrift", published Nov. 29, 1984 (p. 29).

*Primary Examiner*—John J. Love
*Assistant Examiner*—Everett G. Diederiks, Jr.

[57] ABSTRACT

A motor-driven truck of the type comprising a front lifting stand, first guide and journalling elements including a longitudinal stand stationary mounted on the chassis, second guide and journalling elements including a stand movable along the stationary stand, and an operator's cab supported by the movable stand and arranged to be placed in a desired position which is variable with respect to the stationary stand and to the front lifting stand as well, said first guide and journalling elements are firmly connected to the movable stand and guided by the stationary stand. The stationary stand is diagonally arranged so that it encompasses an acute angle $\alpha$ with the center line $C_1$ of the truck and so that it extends between a rear place at the center line $C_1$ and a front place at a front corner of the truck near one side of the lifting stand, whereby the movable stand includes a horizontal stand member located under the cab and a vertical stand member rigidly connected to the horizontal stand member and arranged close to the rear surface of the cab. The journalling elements are firmly mounted onto the under side of the horizontal stand member. The second guide and journalling elements are firmly connected to the cab and guided by the vertical stand member. Furthermore, first force-transmitting members are connected to the stationary stand and to the horizontal stand member for controlled stepless movement of the cab and the movable stand along the stationary stand, whereas second force-transmitting members are connected to the rear surface of the cab and to the movable stand for controlled stepless movement of the cab along the vertical stand member.

8 Claims, 6 Drawing Figures

ADJUSTABLE OPERATOR CAB ON A MOTOR-DRIVE TRUCK

FIELD OF THE INVENTION

The present invention relates to a motor-driven truck of the type comprising a longitudinal chassis, a lifting stand mounted on the front end thereof, and an operator's cab supported by a movable stand and arranged to be placed in a desired position which is variable.

BACKGROUND OF THE INVENTION AND PRIOR ART

A commonly known problem with motor-driven trucks of the type described is that the operator's sight within the operating range of the truck is essentially limited owing to the lifting stand and its different accessories laying in front of him. Even if the operator moves to the side in the limited space in his cab, he cannot with his eyes get satisfactory contact with all places in front of the lifting stand where an object is to be handled with a lifting yoke or forks. From inter alia the safety aspect such working conditions are extremely unsatisfactory. Moreover the handling is delayed.

SE B 348 172 describes a vehicle which is especially intended for side directed loading and is provided with an operator's cab which is displaceable in the latitudinal direction of the vehicle so that the operator can place the cab in a side position where he better can survey the load and its handling with the forks located at the central portion of a longitudinal side. Thus, the operator's cab is moved only in a horizontal plane in a straight transverse path and only a part of the forks and load can be surveyed when these are located at a level under the operator's cab.

Also GB A 1 216 592 relates to a vehicle which is especially intended for side directed loading where the operator's cab of the vehicle is movable in a vertical plane in a straight path or alternatively in an arc-shaped path. Also in this case the operator's possibility to survey the load and forks will be limited.

In an article in the Swedish journal "Ny Teknik, Teknisk Tidskrift, 1984:48, page 29", a fork truck is described of the type which supports a front lifting stand on one end thereof where the operator's cab can be moved in a vertical plane in a straight path so that the operator can place the cab at a desired height level where he better can survey the load and its handling with the forks positioned at one short side. However, this possibility to place the operator's cab is not sufficient since the truck in addition thereto has to be provided with a TV-camera on the top of the lifting stand and a monitor in the operator's cab so that forks and load can be surveyed. However, the combination of TV-camera and vertically movable operator's cab gives no possibility to survey the forks and load from the side.

EP A 0 113 335 describes a motor vehicle to be used especially in agriculture. The motor vehicle is provided with an operator's cab which is movable horizontally in a straight path in the longitudinal direction of the vehicle and in a straight path in the latitudinal direction of the vehicle and in a vertical plane in an arc-shaped path as well. For this purpose the vehicle has a stationary longitudinal stand and a transverse stand which is suspended in parallelogram link arms and movable along the stationary stand. The transverse stand supports the operator's cab via a carriage by which the operator's cab can be moved on the link-suspended stand in the latitudinal direction of the vehicle. By means of the stand suspended in parallelogram link arms the operator's cab can be placed by a pivoting movement in different height positions, however, the distance between the uppermost and lowest positions will be comparatively short owing to constructional considerations to be taken. Thus, the length of the link arms has to be limited depending on the great stresses on the bearings of the link arms, particularly when the vehicle is driven on un uneven surface. The principle according to this patent specification is therefore not applicable to trucks having front lifting stand where it is desired to displace the operator's cab to such a high level that the operator can see above the top portion of the lifting stand or its lifting yoke, i.e. a displacement from a lower position to an upper position a distance of one or more meters taking into account stability problem.

SUMMARY OF THE INVENTION

The object of the present invention is to reduce essentially the above-mentioned problems and provide a truck with such a movable operator's cab that it will be possible to improve the field of vision and sight in every situation depending on the goods to be handled and the lifting equipment supported by the lifting stand, and to provide an improved construction for this displacement which is simple and stable and enables quick displacement of the operator's cab to a desired position.

The present invention relates to a motor-driven truck comprising a longitudinal chassis, a lifting stand mounted on the front end thereof, first guide and journalling means including a longitudinal stand stationary mounted on the chassis, second guide and journalling means including a stand movable along said stationary stand, an operator's cab supported by said movable stand and arranged to be placed in a desired position which is variable with respect to said stationary stand and to the front lifting stand as well, said first guide and journalling means including journalling elements which are firmly connected to the movable stand and guided by the stationary stand, and first and second force-transmitting means arranged for moving the operator's cab to said desired position. Said stationary stand is diagonally arranged so that it encompasses an acute angle $\alpha$ together with the longitudinal centre line $C_1$ of the truck and so that it extends between a rear place at substantially said centre line $C_1$ and a front place at substantially a front corner of the truck near one side of the front lifting stand, and said movable stand includes a horizontal stand member located under the operator's cab and a vertical stand member rigidly connected to the horizontal stand member and arranged close to the rear surface of the operator's cab facing away from the front lifting stand. Said journalling elements are firmly mounted onto the under side of the horizontal stand member of the movable stand, and said second guide and journalling means includes journalling elements firmly connected to the operator's cab and guided by the vertical stand member of the movable stand, said first force-transmitting means is connected to the stationary stand and to the horizontal stand member of the movable stand for controlled movement of the operator's cab and the movable stand along the stationary stand, whereas said second force-transmitting means is connected to the rear surface of the operator's cab facing away from the front lifting stand and to the movable stand for controlled movement of the operator's cab along the vertical stand member of the movable stand, the operator's cab being thus arranged to be placed in said desired position with its horizontal longitudinal central line $C_2$ maintained parallel to the centre line $C_1$ of the truck and with maintained alignment in the vertical planes.

BRIEF DESCRIPTION OF THE DRAWINGS

The invention will be described further in the following with reference to the accompanying drawings, wherein

With reference to FIGS. 1–3 a motor-driven truck is shown therein having a longitudinal chassis 1, a cab 2 for the truck operator located above the chassis and a mast-like lifting stand 3 supported by the front end of the chassis which is pivotably journalled to the chassis of the truck in a manner known per se about horizontal journalling pins (not shown) and can be adjusted by means of tilt cylinders 4 to the desired forward or backward inclination. The lifting stand 3 includes a lifting carriage 5 which in the embodiment shown supports two forks 6, 7 protruding freely forwardly. The expression longitudinal chassis means that the chassis is essentially, e.g. twice to three times, longer than the horizontal extension of the operator's cab.

Figure 1:
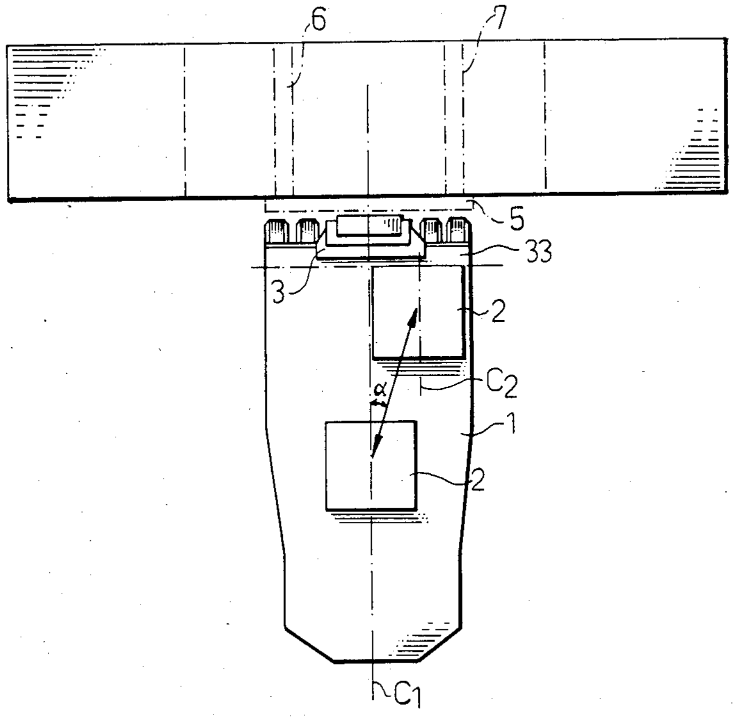
FIG. 1 shows schematically a motor-driven truck from above and illustrates the principle for movement of the operator's cab in accordance with the invention.
Figure 4:
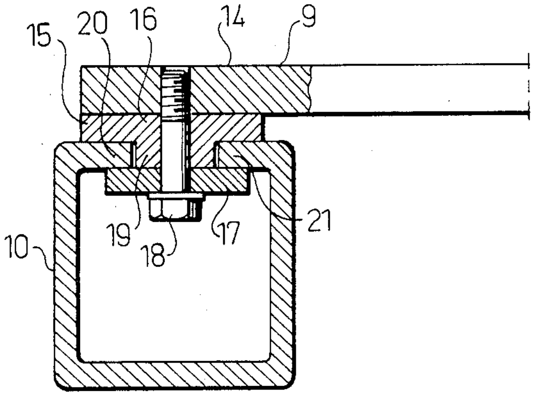
FIG. 4 is a cross section through parts of the guide and journalling means of the truck according to FIGS. 2 and 3.

The truck comprises a first guide and journalling means which includes a longitudinal stand 8 (FIG. 2) stationary mounted on the top surface of the chassis. In the embodiment shown it consists of two horizontal rails 10, 11 which are parallel with each other and located at a suitable distance above the chassis 1 and firmly connected to this by means of a plurality of vertical stays 12. The stationary stand 8 extends obliquely above the chassis, i.e. diagonally, and encompasses thereby an acute angel $\alpha$ together with the longitudinal centre line $C_1$ of the truck. The stationary stand 8 extends between a rear place and a front place adjacent a front corner 33 of the truck which is located near and at the side of the front lifting stand 3. In the preferred embodiment shown said rear place is at the middle of the truck, i.e. at said centre line $C_1$. Alternatively the stationary stand can extend backwardly a further distance past the centre line $C_1$. In the embodiment shown said angle $\alpha$ is about 18°, however, it can be varied within the range of 10°–40°, preferably within the range of 15°–25°.

Furthermore, the truck comprises a second guide and journalling means which includes a stand 9 movable arranged onto said stationary stand 8. The movable stand 9 carries the operator's cab and consists of a horizontal stand member 14 located under the operator's cab, and a vertical stand member 13 which is rigidly connected to the horizontal stand member 14 and arranged close to the rear surface 23 of the operator's cab facing away from the front lifting stand 3.

The first guide and journalling means includes journalling elements which are firmly connected to the movable stand 9 and guided by the stationary stand 8. In the embodiment shown the journalling elements are formed as two parallel longitudinal guides 15 in sliding engagement with the rails 10, 11 of the stationary stand 8. Each guide consists of an upper T-shaped member 16 and a flat member 17, said members being bolted firmly to each other and to the horizontal stand member 14 by means of bolts 18. The flat member 17 is wider than the spine 19 of the T-member so that opposing, horizontal grooves are formed to receive two facing flanges 20, 21 of each rail 10, 11.

These grooves and flanges are adapted to each other so that the guide 15 can be moved slidably along its rail in a free way without being impeded by a wedge action or the like.

A first force-transmitting means in the form of a hydraulic cylinder 22 is arranged on the inside of one rail 11 (FIG. 3) and is attached by one cylinder end to said rail and by its piston end to the horizontal stand member 14 of the movable stand 9. The movable stand 9 and the cab 2 carried by the stand are arranged to be moved along the rails 10, 11 to be adjusted to the desired position in relation to the lifting stand. The guides 15 are firmly mounted on the lower side of the horizontal stand member 14, with the same oblique alignment in relation to the centre line $C_2$ of the cab as that of the rails 10, 11 in relation to the longitudinal centre line $C_1$ of the chassis. The cab will thus be correctly positioned and will face forwardly in all positions in which it is placed, i.e. the centre line $C_2$ of the cab is always parallel to the centre line $C_1$ of the chassis.

In the embodiment shown the horizontal stand member 14 consists of a solid flat plate. Alternatively it can consist of a frame which in the same way carry the two guides 15.

Figure 5:
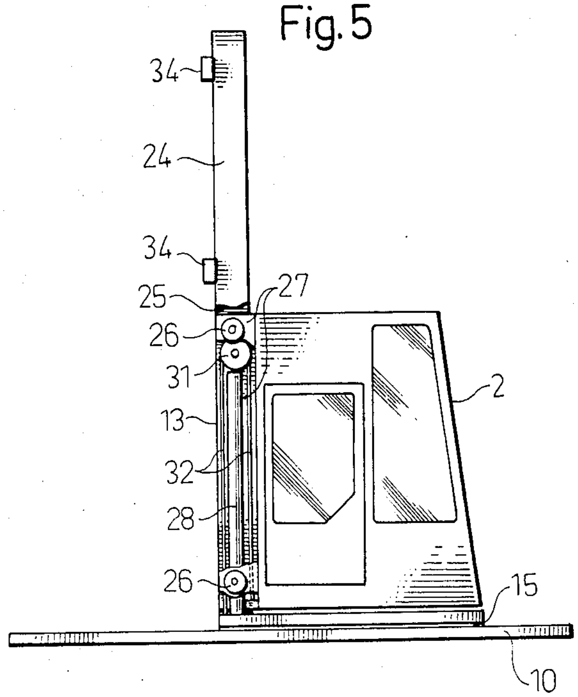
FIGS. 5 and 6 show from the side and the rear, respectively, the operator's cab with associated parts of the guide and journalling means.

The vertical stand member 13 is, as mentioned above, firmly connected to the horizontal stand member 14 to form a rigid unit. The rear surface 23 of the operator's cab is located as close to the vertical stand member 13 as possible to avoid stability problem. The length of the vertical stand member 13 is at least twice the height of the operator's cab 2. The vertical stand member 13 forms guide elements for the operator's cab and has two U-beams 24, 25, the groove forming openings of which are facing each other. The U-beams 24, 25 are spaced from each other and located adjacent to each rear corner of the operator's cab 2. In addition to the movable stand 9 the second guide and journalling means includes journalling members firmly connected to the operator's cab and guided by the vertical stand member 13. In the embodiment shown the journalling members for each U-beam are in the form of two carriage wheels 26 arranged vertically above each other and supported by the operator's cab. The carriage wheels run in the openings of the U-beams 24, 25 in order to keep the operator's cab in a stable position laterally and forwardly and backwardly as well. The carriage wheels 26 have their horizontal axes mounted to longitudinal spaced assembly elements 27 attached to the rear surface 23 of the cab. In FIG. 5 a lower portion of the nearest U-beam 25 has been removed to offer a better view.

A second force-transmitting means in the form of a hydraulic cylinder 28 is arranged in a central position between the U-beams 24, 25 and is attached by its one cylinder end to the horizontal stand member 14 of the movable stand 9. The piston end of the vertical hydraulic cylinder 28 carries a horizontal assembly yoke 29 with two chain wheels 31 around which chains 32 run. Each chain is attached by its one end to the horizontal stand member 14 and by its other end to a lower part of the operator's cab. The operator's cab 2 is thus arranged to be raised and lowered in a stepless controllable manner by the operator to be placed at a desired level with respect to the stationary stand 8 so that the operator is offered an increased field of vision and the best sight in any particular occasion when manoeuvering the truck and its lifting tools, i.e. forks or yokes.

The reference number 30 designates a flexible cable groove for cables and hoses connected to the operator's cab.

Thus, in accordance with the invention the operator's cab 2 is movable both horizontally and vertically, whereby the horizontal movement is done diagonally or obliquely in relation to the longitudinal centre line $C_1$ of the truck between a central rear end position and a diagonal front end position in relation to the lifting stand. In the last-mentioned end position and all intermediate positions the truck is located at a distance from said centre line $C_1$. The movement in vertical direction is done between a lower position and an upper position. In the last-mentioned position and all intermediate positions the operator's cab is thus raised from the chassis and also from the horizontal stand member 14. Accordingly, the cab can be located in any position within a vertical rectangular diagonal (angle $\alpha$) surface, the outer lines of which are generated by the operator's cab when moving in any of two horizontal and two vertical outer paths. This possibility to move the operator's cab stepless in a diagonal path and a vertical path between a rear central position and a front side position and between a lower position and an upper position, respectively, results in essential advantages so that the best possible field of vision and sight line can be obtained quickly depending on the work to be carried out. In connection with fork handling when the lifting carriage of the front lifting stand carries forks the operator's cab is located in its front position at and near one side of the front lifting stand and in a correct height adapted to the positions of the forks and load so that the engagement areas thereof can be surveyed without the sight line being obstructed detrimentally by the front lifting stand and its accessories. In connection with yoke handling of containers the lifting carriage of the front lifting stand is provided with a lifting yoke and the operator places himself and the cab further backwardly above the chassis and substantially at the middle thereof and in a suitable height, preferably the top position, so that the operator is offered a sufficiently wide field of vision both horizontally and vertically and also the best possible sight forwardly and obliquely upwardly and downwardly.

The guide arrangement shown is preferred, however, other journalling elements can be used for journalling the movable stand on the stationary stand, e.g. carriage wheels, whereby the rails are modified in a corresponding manner. Likewise the preferred carriage wheels for journalling the cab on the vertical stand member can be replaced by other journalling elements, e.g. guides, whereby the U-beams are modified in a corresponding manner.

Figure 2:
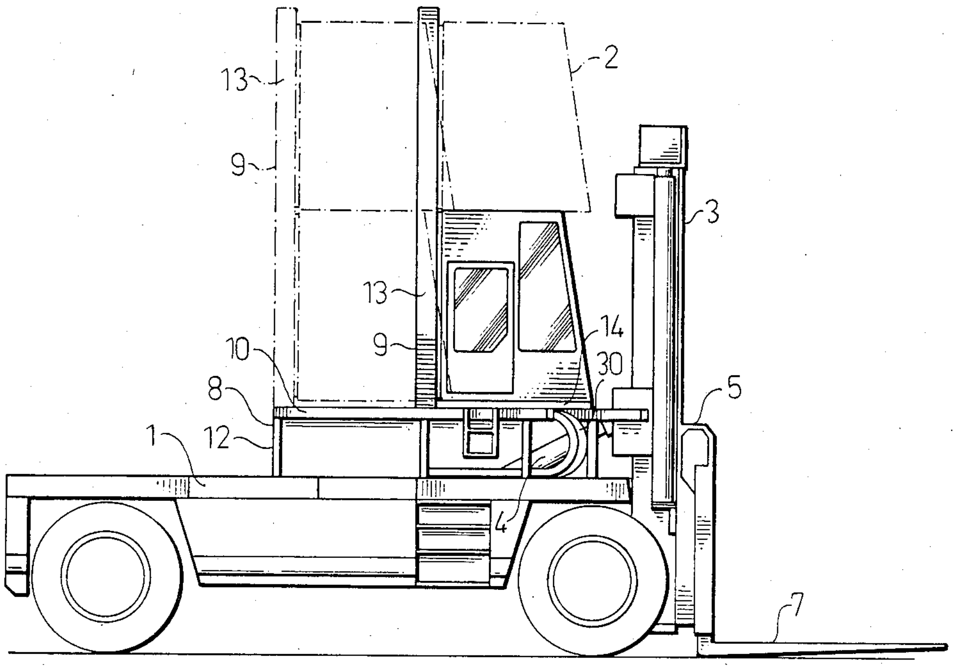
FIGS. 2 and 3 show schematically the truck from the side and from above, respectively, and equipped with an adjustable operator's cab according to a preferred embodiment of the invention.
Figure 3:
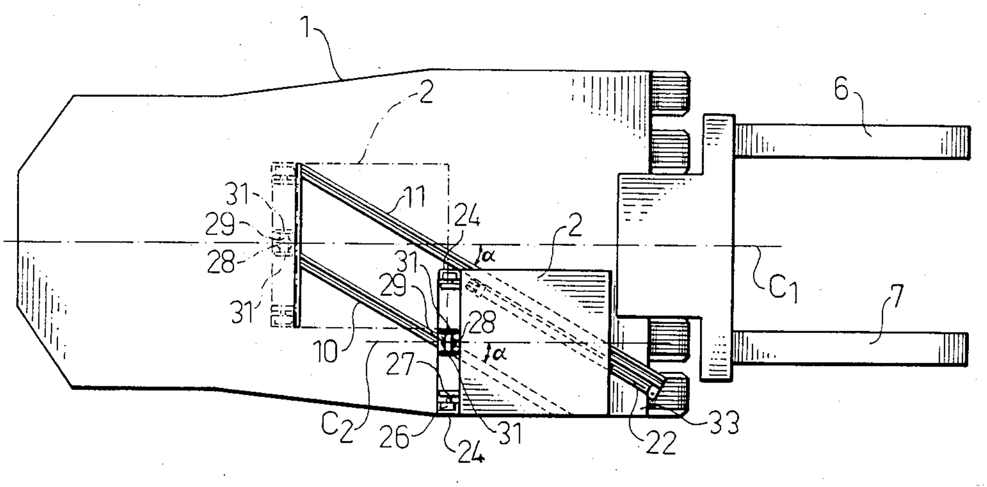
Figure 6:
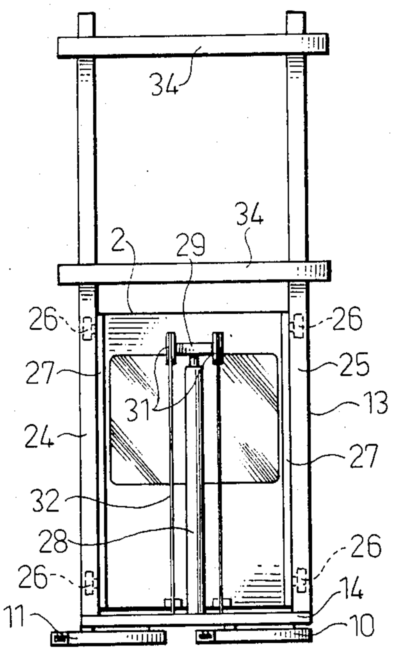

As is clear from FIGS. 5 and 6 the upper portion of the vertical stand part 13 is provided with two cross bars 34. In FIGS. 2 and 3 the cross bars have been omitted only to make other portions more clear.

What I claim is:

1. A motor-driven truck comprising a longitudinal chassis, a lifting stand mounted on the front end thereof, first guide and journalling means including a longitudinal, stationary stand mounted on the chassis, second guide and journalling means including a stand movable along said stationary stand, an operator's cab supported by said movable stand and arranged to be placed in a desired position which is variable with respect to said stationary stand and to the front lifting stand as well, said first guide and journalling means including journalling elements which are firmly connected to the movable stand and guided by the stationary stand, and first and second force-transmitting means arranged for moving the operator's cab to said desired position, said stationary stand being diagonally arranged so that it encompasses an acute angle $\alpha$ together with a longitudinal center line of the truck and so that it extends between a rear place at substantially said longitudinal center line and a front place at substantially a front corner of the truck near one side of the front lifting stand, said movable stand including a horizontal stand member located under the operator's cab and a vertical stand member rigidly connected to the horizontal stand member and arranged close to the rear surface of the operator's cab facing away from the front lifting stand, said journalling elements being firmly mounted onto the under side of the horizontal stand member of the movable stand, said second guide and journalling means including journalling elements firmly connected to the operator's cab and guided by the vertical stand member of the movable stand, said first force-transmitting means being connected to the stationary stand and to the horizontal stand member of the movable stand for controlled movement of the operator's cab and the movable stand along the stationary stand, and said second force-transmitting means being connected to the rear surface of the operator's cab facing away from the front lifting stand and to the movable stand for controlled movement of the operator's cab along the vertical stand member of the movable stand, the operator's cab being thus arranged to be placed in said desired position with its horizontal longitudinal central line maintained parallel to the said longitudinal center line of the truck and with maintained alignment in a vertical plane.

2. A motor-driven truck according to claim 1 wherein said stationary stand includes two horizontal rails parallel to each other and encompassing said angle $\alpha$ with said longitudinal center line of the truck, and said journalling elements of the first guide and journalling means includes two horizontal guides parallel to each other and in slidable engagement with the rails and firmly mounted onto the under side of the horizontal stand member.

3. A motor-driven truck according to claim 2 wherein said first force-transmitting means comprises a double-acting hydraulic cylinder firmly connected to one of the rails and the horizontal stand member.

4. A motor-driven truck according to claim 1 wherein said second force-transmitting means comprises a double-acting hydraulic cylinder firmly connected to the horizontal stand member of the movable stand and to the operator's cab via chains.

5. A motor-driven truck according to claim 1 wherein said vertical stand member includes two U-beams, and said journalling means for journalling the operator's cab includes a plurality of carriage wheels mounted onto the operator's cab and arranged to run in the openings of said U-beams facing each other.

6. A motor-driven truck according to claim 1 wherein the length of the vertical stand member is at least twice the height of the operator's cab.

7. A motor-driven truck according to claim 1 wherein said angle $\alpha$ is in the range of 10°–40°.

8. A motor-driven truck according to claim 7 wherein said angle is in the range of 15°–25°.

* * * * *